United States Patent
Edelinski

(10) Patent No.: US 6,758,167 B1
(45) Date of Patent: Jul. 6, 2004

(54) MODULAR PET HOUSE

(76) Inventor: Mark S. Edelinski, 6184 Wisewood La., Long Beach, MS (US) 39560

( * ) Notice: Subject to any disclaimer, the term of this patent is extended or adjusted under 35 U.S.C. 154(b) by 0 days.

(21) Appl. No.: 10/438,381

(22) Filed: May 16, 2003

(51) Int. Cl.$^7$ ................................. A01K 1/03
(52) U.S. Cl. .................. 119/498; 446/110; 446/476
(58) Field of Search ................. 119/498, 452, 119/472, 473, 482, 484, 485, 499, 706; 446/108, 109, 110, 476, 478

(56) References Cited

U.S. PATENT DOCUMENTS

| | | | |
|---|---|---|---|
| 219,226 A | | 11/1879 | Holton |
| 309,046 A | | 7/1884 | Anderson |
| 407,861 A | | 4/1889 | Teng |
| 3,906,659 A | * | 9/1975 | Walmer .............. 446/110 |
| 4,177,761 A | | 12/1979 | Bellocchi, Jr. |
| 4,327,667 A | * | 5/1982 | Bilak .............. 119/166 |
| 4,347,807 A | * | 9/1982 | Reich .............. 119/499 |
| 5,050,536 A | | 9/1991 | Baker |
| 5,121,710 A | * | 6/1992 | Gonzalez .............. 119/498 |
| D331,821 S | * | 12/1992 | McDaniels, II .......... D30/108 |
| 5,220,883 A | * | 6/1993 | Long .............. 119/499 |
| 5,320,065 A | * | 6/1994 | Leopold .............. 119/498 |
| 5,337,700 A | | 8/1994 | Toft |
| 5,423,709 A | * | 6/1995 | Summers .............. 446/478 |
| D371,641 S | * | 7/1996 | Crowley .............. D30/108 |
| 5,752,470 A | * | 5/1998 | Koneke .............. 119/499 |
| 5,964,189 A | | 10/1999 | Northrop et al. |
| 5,979,366 A | | 11/1999 | Cook |
| 6,318,295 B1 | * | 11/2001 | Wade .............. 119/500 |
| D461,937 S | * | 8/2002 | Small .............. D30/108 |
| D469,584 S | * | 1/2003 | Shepherd .............. D30/112 |

* cited by examiner

Primary Examiner—Yvonne R. Abbott

(57) ABSTRACT

A modular pet house includes a housing including a peripheral wall comprising a front wall, a back wall, a first side wall and a second side wall. The peripheral wall has an upper edge and a bottom edge. The front wall has an opening positioned therein extending upwardly from the bottom edge. A plurality of mountings is selectively mountable in the housing. A panel has an upper side, a lower side and a peripheral edge. The panel has an opening extending therethrough. The panel has the same shape and size as an interior perimeter of the housing. The panel is selectively positionable on the plurality of mountings.

18 Claims, 4 Drawing Sheets

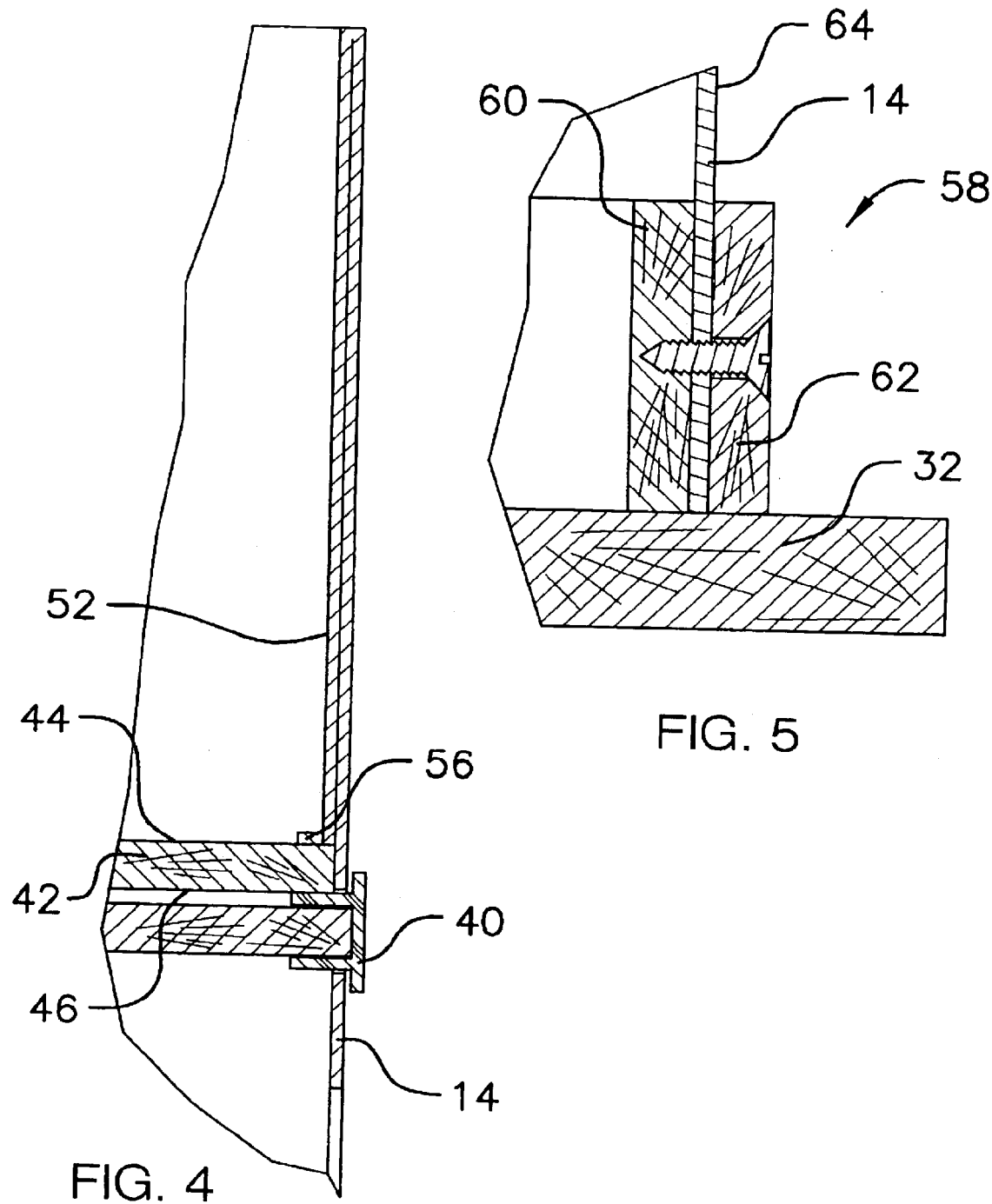

MODULAR PET HOUSE

BACKGROUND OF THE INVENTION

1. Field of the Invention

The present invention relates to pet houses and more particularly pertains to a new pet house for positioning indoors for a cat.

1. Description of the Prior Art

The use of pet houses is known in the prior art. While these devices fulfill their respective, particular objectives and requirements, the need remains for a device that is lightweight and is able to be disassembled into a generally flap structure.

SUMMARY OF THE INVENTION

The present invention meets the needs presented above by providing a housing which may is formed of a cardboard box that is selectively collapsible.

Another object of the present invention is to provide a new pet house that includes a plurality of support devices for retaining the housing in an upright position when fully assembled.

To this end, the present invention generally comprises a housing including a peripheral wall comprising a front wall, a back wall, a first side wall and a second side wall. The peripheral wall has an upper edge and a bottom edge. The front wall has an opening positioned therein extending upwardly from the bottom edge. A plurality of mountings is selectively mountable in the housing. A panel has an upper side, a lower side and a peripheral edge. The panel has an opening extending therethrough. The panel has the same shape and size as an interior perimeter of the housing. The panel is selectively positionable on the plurality of mountings.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a schematic cross-sectional view taken along line 4—4 of FIG. 1 of the present invention.

FIG. 5 is a schematic cross-sectional view taken along line 5—5 of FIG. 1 of the present invention.

DESCRIPTION OF THE PREFERRED EMBODIMENT

Figure 1:
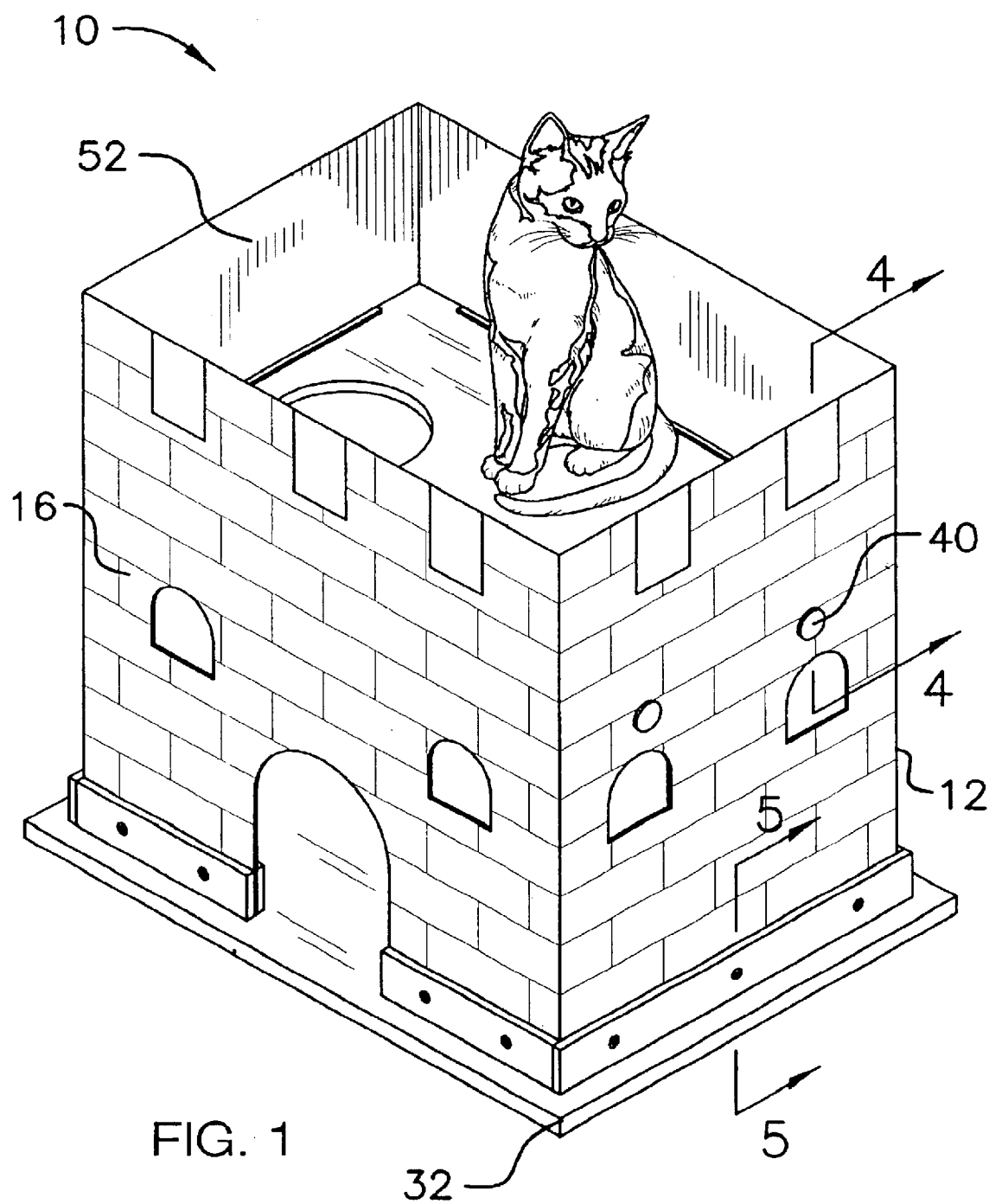
FIG. 1 is a schematic perspective view of a modular pet house according to the present invention.
Figure 2:
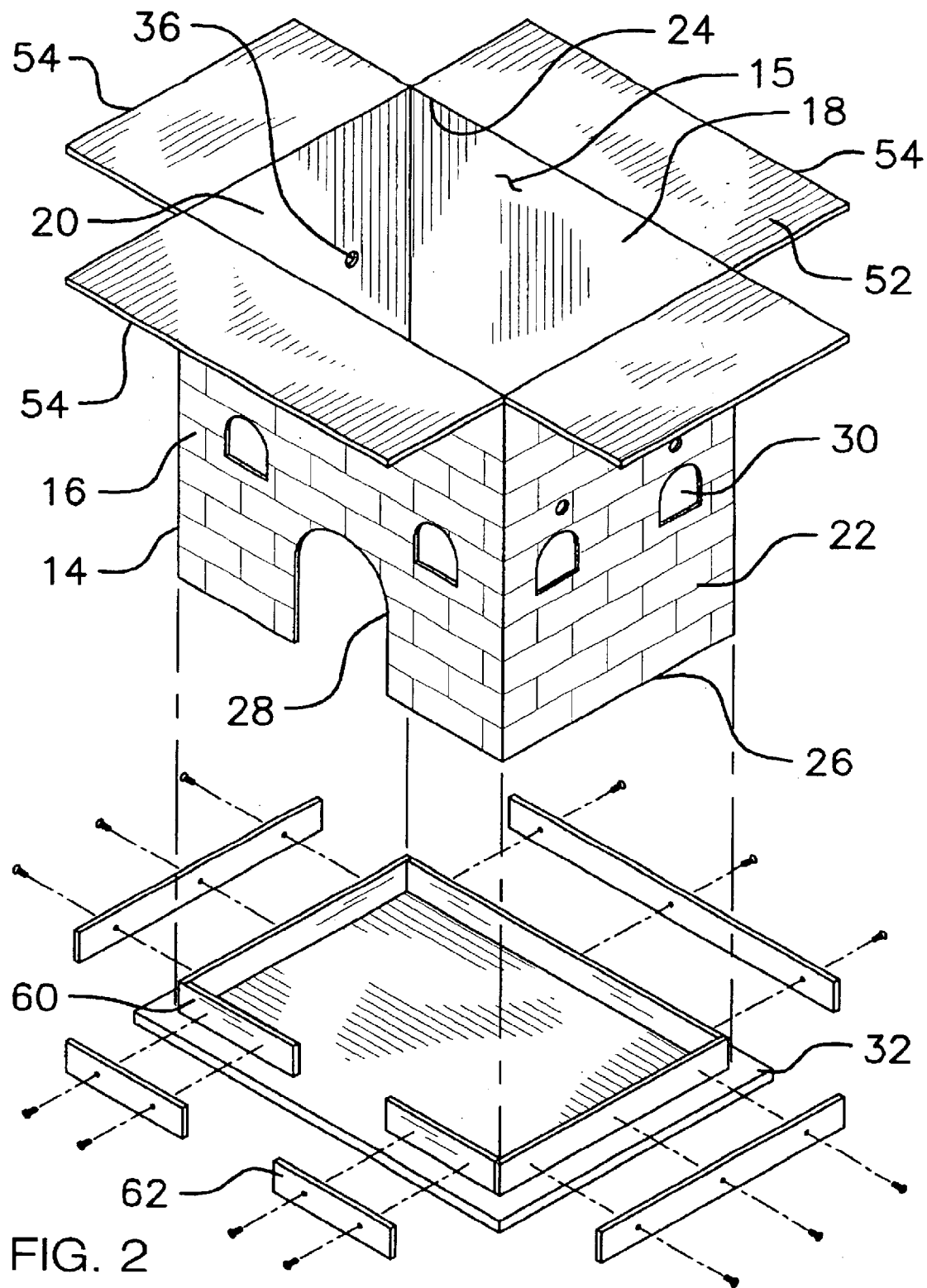
FIG. 2 is a schematic perspective expanded view of the present invention.
Figure 3:
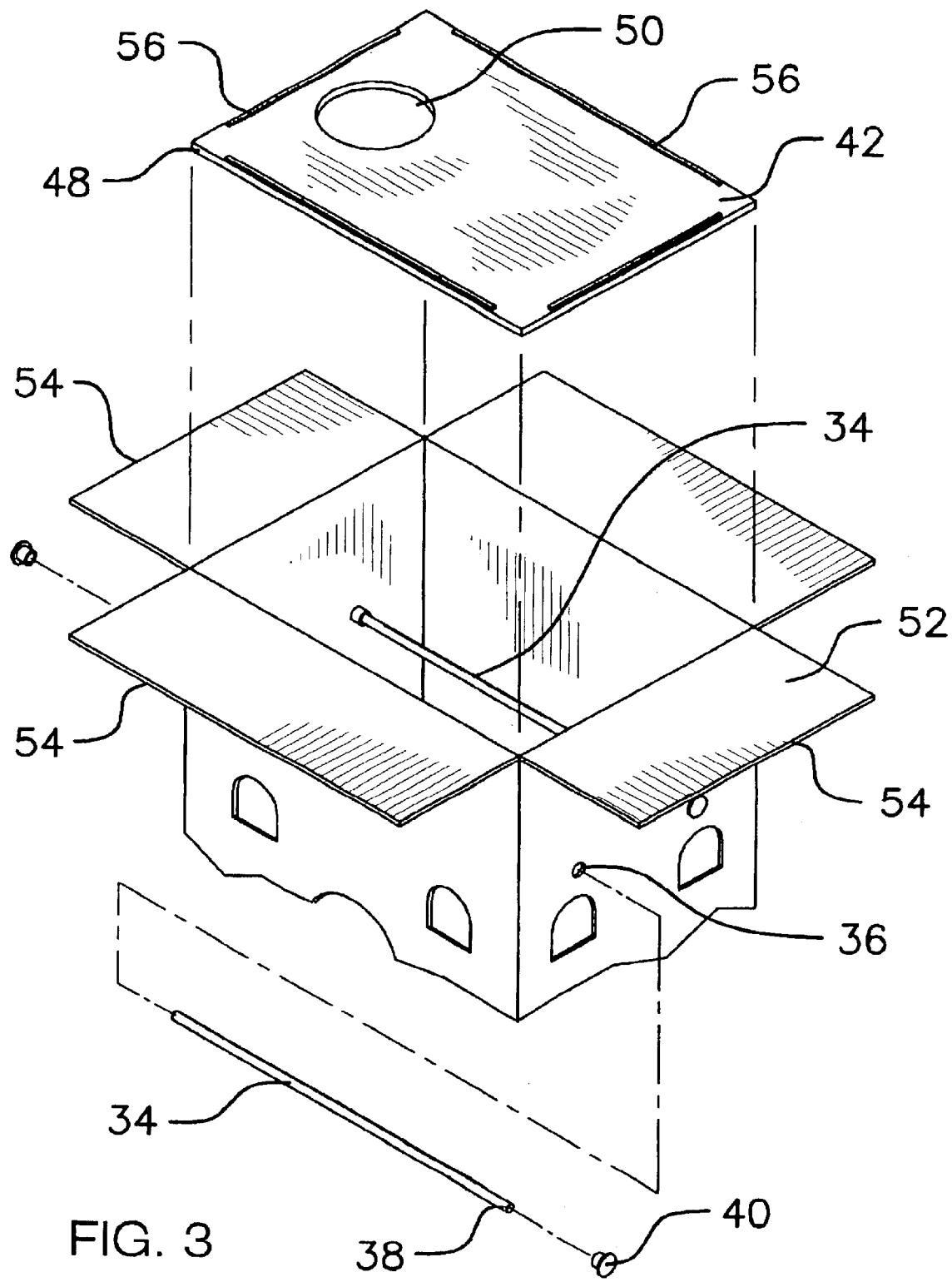
FIG. 3 is a schematic perspective expanded view of the present invention.

With reference now to the drawings, and in particular to FIGS. 1 through 5 thereof, a new pet house embodying the principles and concepts of the present invention and generally designated by the reference numeral 10 will be described.

As best illustrated in FIGS. 1 through 5, the modular pet house 10 generally comprises a housing 12 having a peripheral wall 14. The peripheral wall 14 includes a front wall 16, a back wall 18, a first side wall 20 and a second side wall 22. The peripheral wall 14 has an upper edge 24 and a bottom edge 26. The front wall 16 has an opening 28, or doorway, positioned therein extending upwardly from the bottom edge 26. A plurality of windows 30 extends through the peripheral wall 14. The housing 12 preferably comprises a cardboard material. A baseboard 32, having a length and width greater than a length and width of the housing 12, is positionable under the housing 12. The housing 12 may be a conventional cardboard box which may be folded flat before the pet house 10 is assembled.

A plurality of mountings 34 is selectively mountable in the housing. The plurality of mountings 34 includes a pair of rods extending through the housing 12. Each of the rods, or mountings 34, extends through apertures 36 in the first 20 and second 22 side walls. The rods 34 are spaced from each other and are orientated generally perpendicular to each other. Each of the rods 34 has a pair of free ends 38 extending outwardly away from a corresponding one of the first 20 and second 22 side walls. Caps 40 may be positioned over the free ends 38 to hold the rods 34 in place.

A panel 42 has an upper side 44, a lower side 46 and a peripheral edge 48. The panel 42 has an opening 50 extending therethrough. The panel 42 has the same shape and size as an interior perimeter of the housing 12 and is selectively positionable on the plurality of mountings 34. The panel 42 comprises a rigid material such as wood or plastic.

Each of a plurality of flaps 52 is pivotally coupled to and extends along one of the upper edges 24 of the front 16, back 18, first side 20 and second 22 side walls. Each of the flaps 52 has a height equal to a distance from the upper edge 24 to the panel 42 when the panel 42 is positioned on the support members 42. The flaps 52 are selectively moved inward of the housing into a support position such that each of the flaps 52 are abutting an inner surface 15 of the peripheral wall 14. The flaps 52 give added stability to the housing 12 so that the housing 12 does not rotate or move along its upper edge 24.

Each of plurality of stops 56 is attached to the panel 42 for holding the flaps 52 in the support position. The stops 56 each comprise a raised area positioned generally adjacent to the peripheral edge 48 of the panel 42. Ideally, the raised areas 56 are raised strips. Each of the flaps 52 has a free edge 54 that is positionable between the inner surface 18 and one of the stops 56.

A plurality of support members 58 is selectively attached to the peripheral wall 14. The support members 58 are positioned adjacent to and extend along a length of the bottom edge 26. The support members 58 include inner support members 60 that are attachable to the inner surface 18 and outer support members 62 that are attachable to an outer surface 64 of the peripheral wall 14. A plurality of fasteners 66 is extendable through the inner 60 and outer 62 supports and a portion of the peripheral wall 14 positioned therebetween. The fasteners 66 are preferably screws. The support members 58 add stability to the cardboard material of the housing. It is envisioned that the inner support members 62 are attached to the base to assist in the assembly of the pet house 10.

In use, the pet house 10, when assembled, is used as a pet house, particularly for a cat. The panel 42 may be sat on by the cat and the cat may move through the opening 50 in the panel 42. The materials used, and the construction of the pet house 10, allow for a very light pet house that is collapsible before it is assembled. This allows for easy shipment and storage when unassembled. Also, the pet house is very easy to assemble.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A modular pet house comprising:
   a housing including a peripheral wall comprising a front wall, a back wall, a first side wall and a second side wall, said peripheral wall having an upper edge and a bottom edge, said front wall having an opening positioned therein extending upwardly from said bottom edge;
   a plurality of mountings being selectively mountable in said housing, said plurality of mountings including a pair of rods extending through said housing, each of said rods extending through said first and second side walls, said rods being spaced from each other; and
   a panel having an upper side, a lower side and a peripheral edge, said panel having an opening extending therethrough, said panel having the same shape and size as an interior perimeter of said housing, said panel being selectively positionable on said plurality of mountings.

2. The modular pet house of claim 1, further including a plurality of flaps, each of said flaps being pivotally coupled to and extending along one of said upper edges of said front, back, first side and second side walls, each of said flaps having a height equal to a distance from said upper edge to said panel when said panel is positioned on said support members, wherein said flaps are selectively moved inward of said housing into a support position such that each of said flaps are abutting an inner surface of said peripheral wall.

3. The modular pet house of claim 2, further including a plurality of stops being attached to said panel for holding said flaps in said support position.

4. The modular pet house of claim 3, wherein each of said stops comprises a raised area positioned generally adjacent to said peripheral edge of said panel, each of said flaps having a free edge being positionable between said inner surface and one of said stops.

5. The modular pet house of claim 1, further including a plurality of support members being selectively attached to said peripheral wall, said support members being positioned adjacent to and extending along a length of said bottom edge.

6. The modular pet house of claim 5, wherein said support members include inner support members being attachable to said inner surface and outer support members being attachable to an outer surface of said peripheral wall, each of said inner and outer supports members being positioned adjacent to said bottom edge, a plurality of fasteners being extendable through said inner and outer supports and a portion of said peripheral wall positioned therebetween.

7. The modular pet house of claim 1, further including:
   a plurality of windows extending through said peripheral wall, said housing comprising a cardboard material;
   said rods being orientated generally perpendicular to each other, each of said rods having a pair of free ends extending outwardly away from a corresponding one of said first and second side walls;
   said panel comprising a rigid material;
   a plurality of flaps, each of said flaps being pivotally coupled to and extending along one of said upper edges of said front, back, first side and second side walls, each of said flaps having a height equal to a distance from said upper edge to said panel when said panel is positioned on said support members, wherein said flaps are selectively moved inward of said housing into a support position such that each of said flaps are abutting an inner surface of said peripheral wall;
   a plurality of stops being attached to said panel for holding said flaps in said support position, each of said stops comprising a raised area positioned generally adjacent to said peripheral edge of said panel, each of said flaps having a free edge being positionable between said inner surface and one of said stops;
   a plurality of support members being selectively attached to said peripheral wall, said support members being positioned adjacent to and extending along a length of said bottom edge, said support members including inner support members being attachable to said inner surface and outer support members being attachable to an outer surface of said peripheral wall, each of said inner and outer supports members being positioned adjacent to said bottom edge, a plurality of fasteners being extendable through said inner and outer supports and a portion of said peripheral wall positioned therebetween; and
   a baseboard having a length and width greater than a length and width of said housing.

8. A modular pet house comprising:
   a housing including a peripheral wall comprising a front wall, a back wall, a first side wall and a second side wall, said peripheral wall having an upper edge and a bottom edge, said front wall having an opening positioned therein extending upwardly from said bottom edge;
   a plurality of mountings being selectively mountable in said housing;
   a plurality of flaps, each of said flaps being pivotally coupled to and extending along one of said upper edges of said front, back, first side and second side walls, each of said flaps having a height equal to a distance from said upper edge to said panel when said panel is positioned on said support members, wherein said flaps are selectively moved inward of said housing into a support position such that each of said flaps are abutting an inner surface of said peripheral wall; and
   a panel having an upper side, a lower side and a peripheral edge, said panel having an opening extending therethrough, said panel having the same shape and size as an interior perimeter of said housing, said panel being selectively positionable on said plurality of mountings.

9. The modular pet house of claim 8, wherein said plurality of mountings includes a pair of rods extending through said housing, each of said rods extending through said first and second side walls, said rods being spaced from each other.

10. The modular pet house of claim 8, further including a plurality of stops being attached to said panel for holding said flaps in said support position.

11. The modular pet house of claim 10, wherein each of said stops comprises a raised area positioned generally adjacent to said peripheral edge of said panel, each of said flaps having a free edge being positionable between said inner surface and one of said stops.

12. The modular pet house of claim 8, further including a plurality of support members being selectively attached to said peripheral wall, said support members being positioned adjacent to and extending along a length of said bottom edge.

13. The modular pet house of claim 12, wherein said support members include inner support members being attachable to said inner surface and outer support members being attachable to an outer surface of said peripheral wall, each of said inner and outer supports members being positioned adjacent to said bottom edge, a plurality of fasteners being extendable through said inner and outer supports and a portion of said peripheral wall positioned therebetween.

14. A modular pet house comprising:

a housing including a peripheral wall comprising a front wall, a back wall, a first side wall and a second side wall, said peripheral wall having an upper edge and a bottom edge, said front wall having an opening positioned therein extending upwardly from said bottom edge;

a plurality of mountings being selectively mountable in said housing;

further including a plurality of support members being selectively attached to said peripheral wall, said support members being positioned adjacent to and extending along a length of said bottom edge, said plurality of support members including inner support members being attachable to said inner surface and outer support members being attachable to an outer surface of said peripheral wall, each of said inner and outer supports members being positioned adjacent to said bottom edge, a plurality of fasteners being extendable through said inner and outer supports and a portion of said peripheral wall positioned therebetween; and a panel having an upper side, a lower side and a peripheral edge, said panel having an opening extending therethrough, said panel having the same shape and size as an interior perimeter of said housing, said panel being selectively positionable on said plurality of mountings.

15. The modular pet house of claim 14, wherein said plurality of mountings includes a pair of rods extending through said housing, each of said rods extending through said first and second side walls, said rods being spaced from each other.

16. The modular pet house of claim 14, further including a plurality of flaps, each of said flaps being pivotally coupled to and extending along one of said upper edges of said front, back, first side and second side walls, each of said flaps having a height equal to a distance from said upper edge to said panel when said panel is positioned on said support members, wherein said flaps are selectively moved inward of said housing into a support position such that each of said flaps are abutting an inner surface of said peripheral wall.

17. The modular pet house of claim 16, further including a plurality of stops being attached to said panel for holding said flaps in said support position.

18. The modular pet house of claim 17, wherein each of said stops comprises a raised area positioned generally adjacent to said peripheral edge of said panel, each of said flaps having a free edge being positionable between said inner surface and one of said stops.

\* \* \* \* \*